United States Patent [19]

Rzeszewski

[11] 4,321,623
[45] Mar. 23, 1982

[54] AUXILIARY TELEVISION SIGNAL SYSTEM

[75] Inventor: Theodore S. Rzeszewski, Lombard, Ill.

[73] Assignee: Matsushita Electric Corp. of America, Franklin Park, Ill.

[21] Appl. No.: 139,848

[22] Filed: Apr. 14, 1980

[51] Int. Cl.³ .............................................. H04N 7/04
[52] U.S. Cl. ..................................... 358/144; 358/145
[58] Field of Search ............... 358/145, 147, 143, 144, 358/16, 146

[56] References Cited

U.S. PATENT DOCUMENTS

| | | | |
|---|---|---|---|
| 3,071,643 | 1/1963 | Matthews | 358/144 |
| 3,378,773 | 4/1966 | Jeffers | 179/1 GS |
| 3,423,520 | 1/1969 | Kelly | 358/143 |
| 3,902,007 | 8/1975 | Justice | 358/145 |
| 3,916,092 | 10/1975 | Justice | 358/145 |
| 3,949,418 | 4/1976 | Srivastava | 358/20 |
| 4,134,127 | 1/1979 | Campioni | 358/16 |

Primary Examiner—John C. Martin
Attorney, Agent, or Firm—LaValle D. Ptak

[57] ABSTRACT

Auxiliary signals suitable for conveying additional audio signals for stereophonic television broadcasts, bilingual sound, and the like, are transmitted in the form of modulated bursts of such auxiliary signal placed on the front porch of the composite video signal and continued through the vertical synchronization pulse intervals. At the receiver, a transmission gate is connected to receive the composite video signal and has an output coupled to an auxiliary signal demodulation circuit. The transmission gate is operated to pass only the auxiliary signal bursts in response to control signals obtained from the sweep circuit of the television receiver. By utilizing composite AM/FM modulation of the auxiliary signal or by employing quadrature modulation, dual or stereophonic sound signals may be obtained for reproduction with corresponding output utilization circuitry.

9 Claims, 8 Drawing Figures

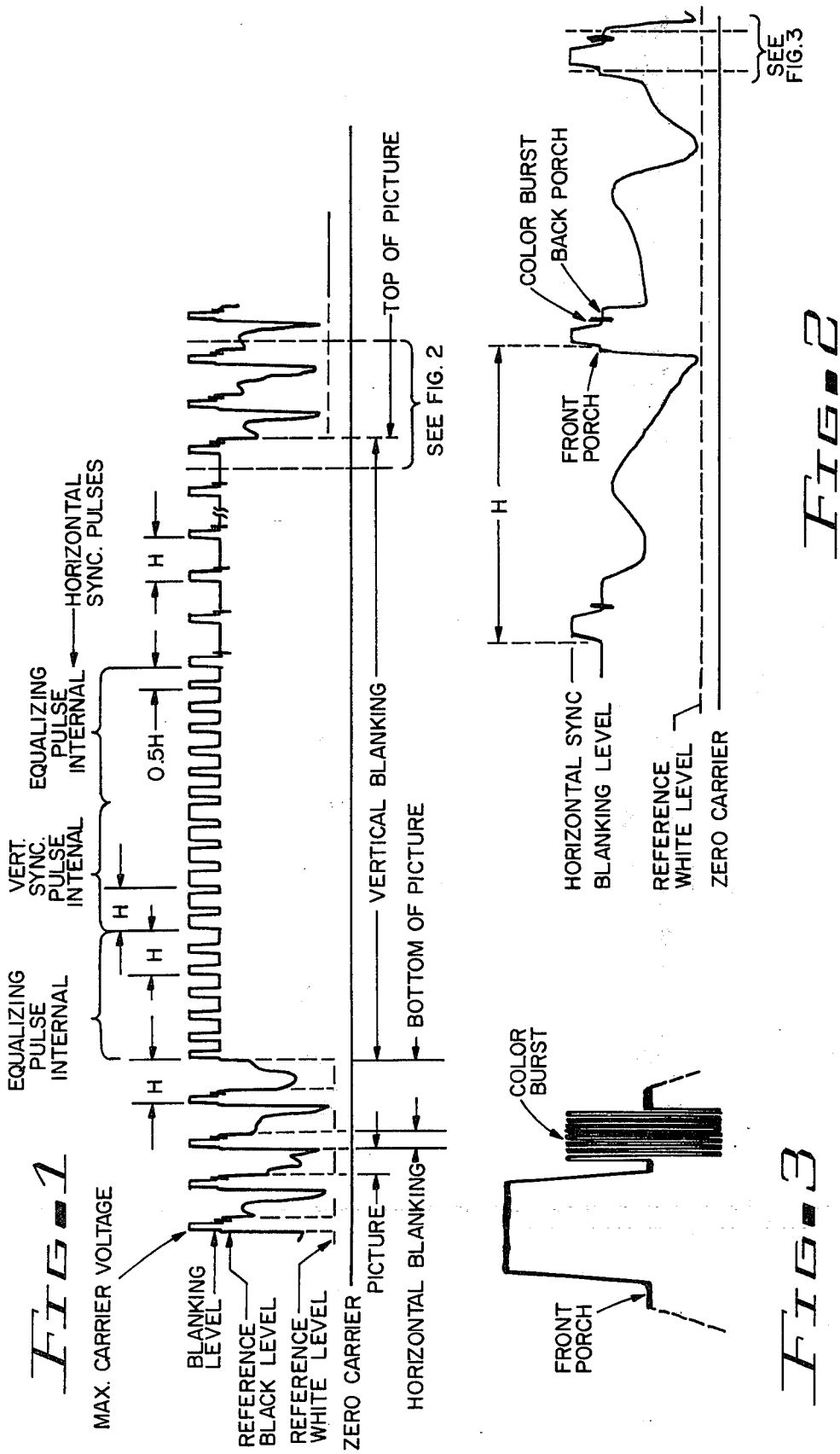

AUXILIARY TELEVISION SIGNAL SYSTEM

BACKGROUND OF THE INVENTION

At the present time a number of different proposals are under consideration for extending the amount of information transmitted in a composite television signal. Various such proposals include the transmission of stereophonic sound; bilingual sound transmission accompanying a single video presentation; continuously transmitted time and temperature information or other digital information which can be decoded and displayed either as text on the screen or supplied to a separate display device; and the like. The composite television signal is a complex signal already carrying large amounts of information, including the picture or video information, sound information, color subcarrier information used to operate color television receivers, horizontal and vertical synchronizing information, blanking, etc. Consequently, to add additional information to the already complex signal generally results in compromises which degrade some other portion of the signal which already is present and necessary.

Various systems have been proposed in the past to add additional auxiliary signals to the composite television signal with a corresponding modification of television receivers to permit them to utilize the auxiliary signals. A number of systems, particularly, have been designed in the past to add an additional sound channel; so that stereophonic or bilingual sound capabilities may be obtained.

Generally these systems place the added or auxiliary signal somewhere in the horizontal blanking interval. For example, two such systems are disclosed in the patents to Hodge, U.S. Pat. No. 3,446,914, and to Rout, U.S. Pat. No. 3,466,387. In both of these patents the auxiliary sound information is placed on the "back porch" of the blanking interval. A location on the back porch for audio or other auxiliary information appears to be a logical choice. This location, however, is used for the color subcarrier signal of the standard composite color television signal. If additional auxiliary information is to be included in this location of the composite signal, it is necessary to extend the length of the back porch to adequately separate the color subcarrier from the added auxiliary signal. Alternatively, it would be necessary to shorten the number of cycles of the color subcarrier. Even if sufficient room is present for both the color and auxiliary signals on the back porch of the blanking interval, this back porch does not carry through the vertical synchronization pulse interval; so that if auxiliary sound information is being transmitted at this location in the composite signal, there are recurring interruptions at the vertical rate. Since this rate is at a 60 Hz frequency, these interruptions may carry over into the sound processing amplifiers and be reproduced by the loudspeakers. This, obviously, is highly undesirable.

Another system where the auxiliary signal is placed on the back porch of the video signal is the system disclosed in the Justice U.S. Pat. No. 3,902,007. The system of this patent uses an extended time on the back porch of alternate lines. This takes time from the video portion of the composite signal (because the back porch has been extended), so that there is some degredation in the video signal content available to be reproduced in the picture at the receiver. In addition, because of this location, the system is not capable of producing 15 KHz audio due to the inherent limitations of the location. Justice, like the systems of Rout and Hodge is also subject to the transmission interruptions of the auxiliary signal during the vertical intervals of the composite television signal. Consequently, this interruption also would result in a disturbance in the audio channels if the auxiliary signal is utilized is a bilingual or other audio signal.

Another approach which has been taken is to place auxiliary sound or other information directly on the synchronization pulse by means of a notch in the synchronization pulse. This location is not subject to the disadvantage of the 60 Hz interruption present when the auxiliary signal is placed on the back porch of the signal; but by notching the synchronization pulses, the energy content of such pulses is reduced in direct proportion to the width of the notch provided for the auxiliary signal transmission. A system of this type is disclosed in the patent to Felgel-Farnholz, U.S. Pat. No. 2,268,001. Since there is a notch in the synchronization pulse of such systems, the receiver is made more suseptible to noise, resulting in a degredation of its performance characteristics.

A different approach which has been attempted for adding auxiliary signals is disclosed in the patent to Campiani, U.S. Pat. No. 4,134,127. In Campiani every second burst of the color subcarrier is replaced with a new burst of a different frequency carrying the auxiliary information. Obviously, a substantial risk of degrading the color synchronization performance of the receivers is present with this approach and, again, it is not capable of reproducing 15 KHz audio signals.

The patent to Fujio, et al., U.S. Pat. No. 3,723,637, discloses a system superimposing digital information on the color burst by means of superimposed amplitude modulated digital signal information having the frequency and phase of the color burst signal. This results in a relatively complex system implementation, both at the transmitter and the receiver and, in addition, is subject to degredation of the color subcarrier signal. The Fujio et al system, however, apparently is capable of transmitting audio information having a 15 KHz frequency as contrasted with other systems which are discussed above and which do not have this capability.

Various other systems have been developed in an attempt to place a modulated auxiliary signal of a multiple-phase modulated carrier on the synchronization pulses. This position, however, is not desirable since it is inherently capable of causing overmodulation of the transmitter. If an attempt is made to ensure that overmodulation does not occur, the modulation of the auxiliary signal is reduced to a point where its effectiveness is impaired, or clipping of the auxiliary signal exists. In any event, a location on the synchronization pulses themselves has been found to be undesirable.

Accordingly, it is desirable to provide a location for, and a receiver responsive to, auxiliary signals not subject to the disadvantages noted above.

SUMMARY OF THE INVENTION

Accordingly, it is an object of this invention to provide an improved auxiliary television signal system.

It is an additional object of this invention to provide an improved system for recovering auxiliary signals from a composite television signal.

It is an additional object of this invention to provide an improved auxiliary television signal system in which auxiliary signals are located on the front porch of the composite video signal.

It is a further object of this invention to provide a television receiver for receiving and utilizing auxiliary signals transmitted on the front porch of a composite television signal.

It is yet another object of this invention to provide an improved receiver for selectively demodulating auxiliary signals located on the front porch of a composite television signal.

In accordance with a preferred embodiment of this invention, an auxiliary signal system for television receivers operates in response to a composite video signal in which modulated auxiliary signals are transmitted on the front porch of the composite video signal. The composite video signal is supplied to the signal processing circuits of the television receiver and also is supplied to a demodulator which demodulates the auxiliary signals. A utilization circuit, such as an audio circuit or the like, is connected to the output of the demodulator for the auxiliary signals to produce a representation of the demodulated auxiliary signals.

In a more specific embodiment of the invention, the auxiliary signal comprises a modulated multiple-cycle signal burst at the frequency of the color subcarrier signal in the composite color television signal. The demodulator, in turn, comprises a synchronous detector provided with a reference signal from the output of the color reference oscillator of a color television receiver. To accomplish the desired demodulation of the auxiliary signal burst, the composite signal is passed through an analog transmission gate to the synchronous detector; and the gate is opened only at the time of occurrence of the subcarrier signal in response to the fly-back pulses obtained from the synchronization circuits of the receiver.

BRIEF DESCRIPTION OF THE DRAWINGS

FIG. 1 is a representative waveform of a portion of a composite color television signal useful in describing the features and the operation of the circuits of preferred embodiments of the invention;

FIG. 2 is an enlarged view of a portion of the circuit shown in FIG. 1;

FIG. 3 is an enlarged view of a portion of the circuit of FIG. 2;

DETAILED DESCRIPTION

Figure 5:
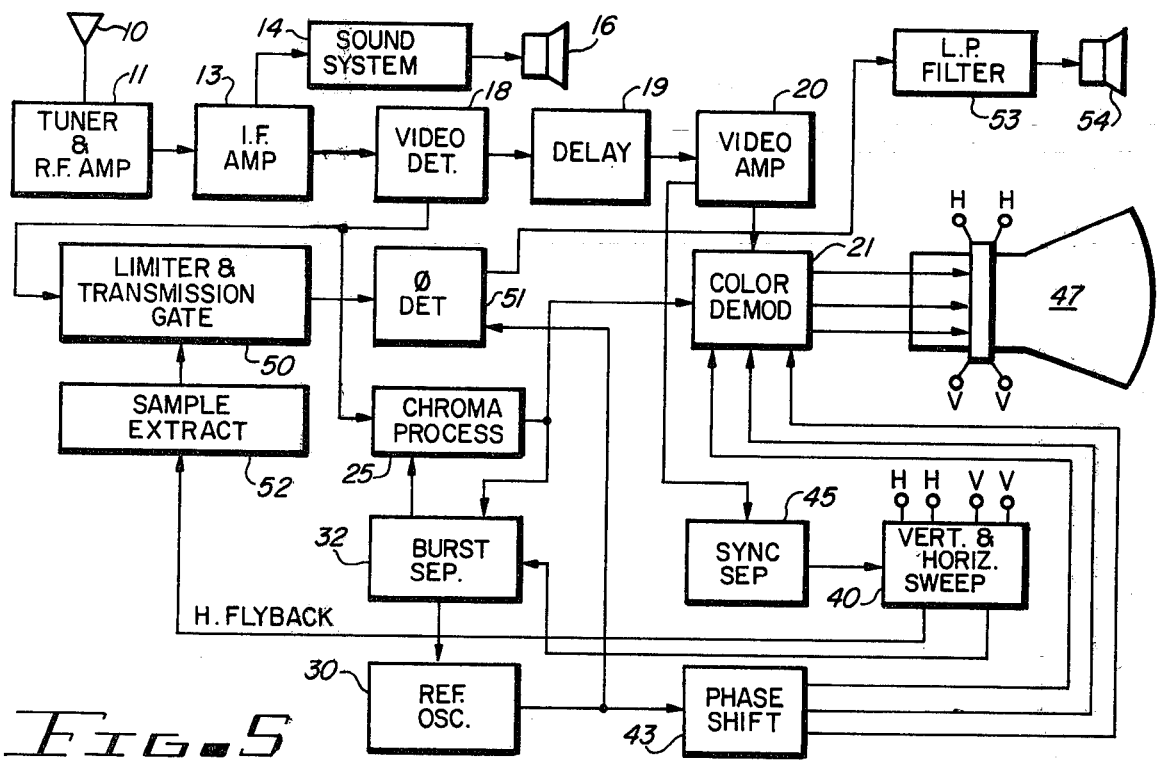
FIG. 5 is a block diagram of a preferred embodiment of the invention.

Reference now should be made to the drawings in which the same reference numbers are used throughout the various figures to designate the same or similar components. FIGS. 1, 2, 3 and 4 illustrate details of composite television signals useful in explaining the operation of the various embodiments of the invention illustrated in the other figures of the drawings.

FIG. 1 is a representation of a conventional composite color television signal. As indicated by the legends on FIG. 1, this signal is comprised of a number of different portions or segments. At the extreme left and extreme right-hand ends of the signal waveform shown in FIG. 1 are the representations of the waveform during the picture reproduction. The central section illustrates the waveforms which are transmitted during the vertical blanking interval (when the vertical trace is returned from the bottom of the picture to the top of the picture to resume a new field), and in addition, the different signal levels are shown. During the vertical blanking interval, the signal is broken into an equalizing pulse interval, followed by a vertical synchronization pulse interval, followed by another equalizing pulse interval which, in turn, is followed by several horizontal synchronization pulses prior to the resumption of the transmission of the picture content for the next frame or field to be displayed. As is apparent from an examination of FIG. 1, which is the standard NTSC composite color television signal, the equalizing pulse intervals and the vertical synchronization pulse intervals each occupy a time duration equal to approximately three horizontal lines.

FIG. 2 is an enlarged representation of the portion of FIG. 1 appearing on the right-hand end of the waveform of FIG. 1. In FIG. 2 the structure of the signal at the horizontal blanking or horizontal synchronization pulse portion is more clearly shown, with each of the horizontal synchronization pulses separated by the variable information conveying the video or picture portion of the signal.

As shown by the legends on the waveform of FIG. 2, each of the blanking pulses is preceded by what is commonly referred to as a "front porch" and is followed by a "back porch" on which the 3.58 MHz color burst or color synchronizing signal is transmitted. The front and back porches of this signal are at a fixed level which is referred to as the "blanking level" of the signal. It should be noted that only the "front porch" portion of this waveform occurs at precisely the same place throughout the entire composite television signal shown in FIG. 1. For example, the "back porch" is missing during the vertical synchronization pulse intervals due to the transmission of relatively wide vertical synchronization pulses. These vertical synchronization pulses are separated only by the front porch portion of the television signal. No "back porch" is present in this part of the composite signal. Consequently, if any auxiliary signals are to be transmitted continuously throughout the entire composite television signal, without interruption, the only location for such signals is on the front porch or on the maximum carrier level of the vertical pulse itself.

If signals are superimposed or transmitted on top of the vertical pulse, it is possible to overmodulate the transmitter or to have clipping of the auxiliary signals due to the fact that the vertical pulses are transmitted at maximum carrier voltage, as indicated in FIG. 1. For most applications of auxiliary signal transmission, the "back porch" portion of the signal has been considered the best location for such auxiliary signals. In color television transmission, however, the color synchronizing signal burst is located on this portion of the signal, as shown most clearly in FIG. 3. Consequently, if an additional auxiliary signal is to be located on the back porch, it generally is necessary to extend the length of the back porch, thereby reducing the time available for the picture information of the signal. In addition, some difficulty exists in preventing interference from occuring from between the color burst signal and any additional auxiliary signal which may be placed in close proximity to this signal on the back porch of the horizontal blanking pulse.

In accordance with a preferred embodiment of this invention, it has been found, particularly for the transmission of auxiliary audio information, that it is desirable to place such auxiliary information on the front porch of the signal. In the case of audio signals, this is particularly advantageous since the front porch exists at a stable, fixed level continuously throughout the entire composite video signal, including the vertical synchronizing pulse interval. Consequently, there is no undesirable interruption of any audio auxiliary signals at the vertical (60 Hz) rate, which otherwise, inherently occurs when the auxiliary signals are placed on the back porch of the composite television signal.

The standards for the minimum width or time duration of the front porch have been set by the FCC (Federal Communications Commission) at 1.27 microseconds. As a practical matter, however, 1.4 microseconds is generally the time duration that the television industry is looking toward as a minimum, with a nominal 1.5 microseconds and a maximum of 1.6 microseconds. Within this time, it is possible to transmit five full cycles (3.58 MHz) of a signal at the color subcarrier frequency rate, occupying a total duration of slightly less than 1.4 microseconds. Thus, this much of an auxiliary signal will just fit if the carrier is at the color subcarrier frequency.

Figure 4:
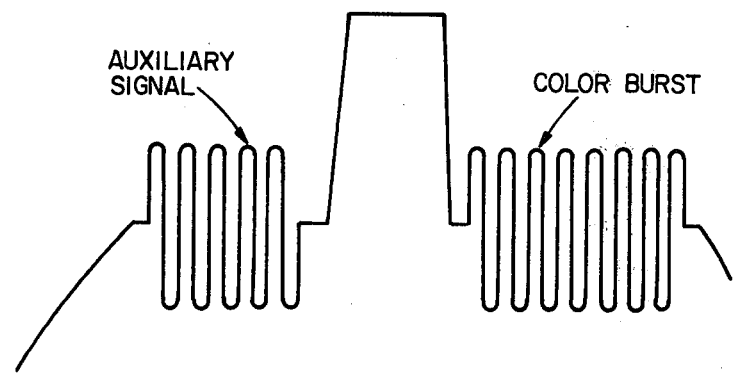
FIG. 4 is an enlarged view of a portion of the waveform similar to the one shown in FIG. 3 illustrating features of the invention.

The location of such a signal on the front porch of the blanking signal is shown in FIG. 4. FIG. 4 also shows an idealized version of the color subcarrier synchronizing signal which is transmitted on the back porch of the signal. Typically, the color subcarrier synchronizing signal constitutes nine cycles of the color subcarrier signal in contrast with the five cycles which are illustrated on the front porch side of the waveform of FIG. 4 showing the subcarrier for auxiliary signals.

The above analysis assumes no bandwidth restrictions in the system. In television transmitters and television receivers, there are bandwidth limitations that cause some lengthening of the pulses. These effects are relatively minor and are tolerable in the system. The effects of bandwidth limitations also can be lessened further by either lowering the frequency of the auxiliary signal carrier burst or by adding additional cycles to the auxiliary signal. Lowering the frequency eliminates the use of the color synchronization circuitry for coherent detection, and adding additional cycles of the reference signal at the color subcarrier frequency requires lengthening of the front porch. For example, seven cycles at 3.58 MHz requires 1.96 microseconds, and six cycles requires 1.68 microseconds. Both of these times are above the nominal and maximum industry target value lengths of the front porch of the composite signal.

At the transmitter, the envelopes of the burst of pulses at the color subcarrier frequency used for the auxiliary signal are rectangular at the point of insertion. The spectrum of this signal is a sin x/x shape, which has ninety percent (90%) of its energy in the main lobe. Further, the main lobe is contained in a bandwidth of ±714 KHz around 3.58 MHz for a 1.4 microsecond burst. Consequently, restricting the video bandwidth to 3.58 MHz+0.71=4.29 MHz has little effect on the amplitude and energy content of the burst. The television video bandwidth is 4.2 MHz, so there is just a slight effect produced by the bandwidth limitation or restriction which occurs. If a 1.68 microsecond burst of signal is used for the auxiliary signal, ninety percent (90%) of the energy is contained within ±595 KHz of the center frequency. Once again, if 3.58 MHz is used for the center frequency, an upper video frequency of 3.58+0.595=4.17 MHz is needed. Similarly, if a 1.96 microsecond width is used with the same reference frequency, an upper frequency of 4.09 MHz is required.

If a different burst frequency other than a burst at the color subcarrier frequency (3.58 MHz) is used, for example, in an AM and FM modulated burst at the same total burst duration, the same spectral bandwidth is retained around the new frequency. Consequently, using a lower frequency requires less maximum video bandwidth. It also should be noted that by the use of a balanced number of half-cycles of energy in the burst, no interference with the blanking signal occurs, since the direct current (DC) component stays equal at the fixed level of the front porch. This is in contrast to a use of binary base band signals since base band auxiliary signals do change the DC level and can result in degredation of system performance.

The signal-to-noise ratio (S/N) of the auxiliary signal as related to the signal-to-noise ratio (S/N) of the video signal is important for fringe area considerations. The S/N performance of this system depends primarily on the amplitude (or maximum amplitude) of the burst which represents the sample height of audio signal and the bandwidth of the audio channel on the auxiliary signal.

Utilization of an auxiliary signal at the 3.58 MHz color subcarrier frequency permits coherent detection in a color television receiver. This is easy to implement since the color television receiver already includes a reference oscillator providing output signals at the color subcarrier frequency. For black and white receivers, however, if coherent detection is employed, it is necessary to add a reference oscillator producing signals at the subcarrier frequency for operating the detectors.

It also is possible to employ coherent detection on color television receivers and non-coherent detection of the auxiliary signal on monochrome receivers. This is possible if the 3.58 MHz subcarrier frequency is employed and only a single sample of the auxiliary signal is used per burst, so that the channel has approximately 7.5 KHz of bandwidth. Thus, the burst may be amplitude modulated and coherently detected on receivers where the regenerated 3.58 MHz signal is available; and envelope detection may be used in receivers where the regenerated color subcarrier reference signal is not available.

There is only one modulation format of the auxiliary signal which is eliminated for receivers where coherent detection is not a possibility. This is the quadrature modulation of two double sideband suppressed carrier signals, which represent two different audio samples. To detect signals modulated in this format, the receiver must have coherent detection. All other types of modulation formats, however, can be detected either coherently or non-coherently. For example, an AM system may use coherent detection depending upon the availability of regenerated carrier, as explained above. Obviously, a simple AM envelope detector also can non-coherently detect the modulation information.

Reference now should be made to FIG. 5 which is a block diagram of a typical color television receiver to which a detection circuit has been added for separating, detecting, and reproducing auxiliary signals encoded on the front porch of the horizontal blanking interval in a signal format of the type illustrated in FIG. 4.

The standard portions of the television receiver include an antenna 10 which supplies the received signals to a tuner and RF amplifier stage 11. The output of the stage 11 is supplied to an IF amplifier 13, which supplies signals to a conventional sound system 14 for reproduction by a loud speaker 16. The IF amplifier also supplies signals to a video detector 18, the output of which passes through a delay circuit 19, is amplified by a video amplifier 20 and is supplied to a color demodulator circuit 21.

Signals from the video detector 18 are also supplied to a chroma processing circuit 25. The circuit 25, in turn, supplies the chroma components of the composite color television signals to an input of the color demodulator 21.

As is well known, a reference oscillator 30, operating at the color subcarrier frequency is synchronized with the color reference burst signal by means of a burst separator circuit 32, supplied with the burst signal from the output of the chroma processing circuit 25, and operated in response to an output signal from the sweep circuitry 40 under control of the synchronization signal separation circuit 45 in a conventional manner. The output of the reference oscillator 30 is supplied to a phase shift circuit 43 to produce the output signals at the three different phases applied to the inputs of the color demodulator 21 for driving the three guns of a color cathode ray tube 47. Color television pictures then are reproduced on the screen of the cathode ray tube 47.

This portion of the circuit shown in FIG. 5, which has been described thus far, is conventional and well known. To permit utilization of additional auxiliary information, either stereophonic audio, bilingual, teletext, or other auxiliary information, encoded as described above in conjunction with the waveform shown in FIG. 4, a limiter and analog transmission gate circuit 50 also is supplied with the output signals of the video detector 18. The output of the transmission gate 50 is connected to one of the inputs of a phase detector 51, which also is supplied with reference signals from the output of the reference oscillator 30. As mentioned previously, for use with a color television system, the auxiliary signal on the front porch preferably is modulated on a five cycle burst of a subcarrier at the color subcarrier frequency of 3.58 MHz, as shown in FIG. 4.

To synchronize the operation of the limiter and transmission gate 50, so that only the auxiliary signal subcarrier burst is supplied to the input of the phase detector 51, a sample extract circuit 52 is connected to the gate input of the limiter and analog transmission gate 50 to cause the normally closed gate 50 to be opened only during the front porch intervals when the auxiliary signal of FIG. 4 is present at its input. Because the auxiliary signals are present on the front porch of all of the horizontal blanking pulses and occur once every horizontal sweep interval, the operation of the sample extract circuit 52 is synchronized to the operation of the television receiver under the control of the composite video signal by causing horizontal fly-back pulses from the horizontal sweep circuit 40 to operate the extract circuit 52. Each fly-back pulse (which occurs during the horizontal blanking interval) causes the initiation of a time delayed output from the sample extract circuit 52 selected to coincide with, and last for only the duration of, the auxiliary signal subcarrier burst.

The output of the phase detector 51 then is a demodulated signal, indicated in FIG. 5 as an audio signal, which is passed through a low pass filter 53 and applied to a loudspeaker 54. Typically, the filter 53 is a low pass filter with approximately a 7.5 KHz bandwidth. In addition, the system has impulse noise immunity because of the time gating which is used in the analog transmission gate 50.

Figure 6:
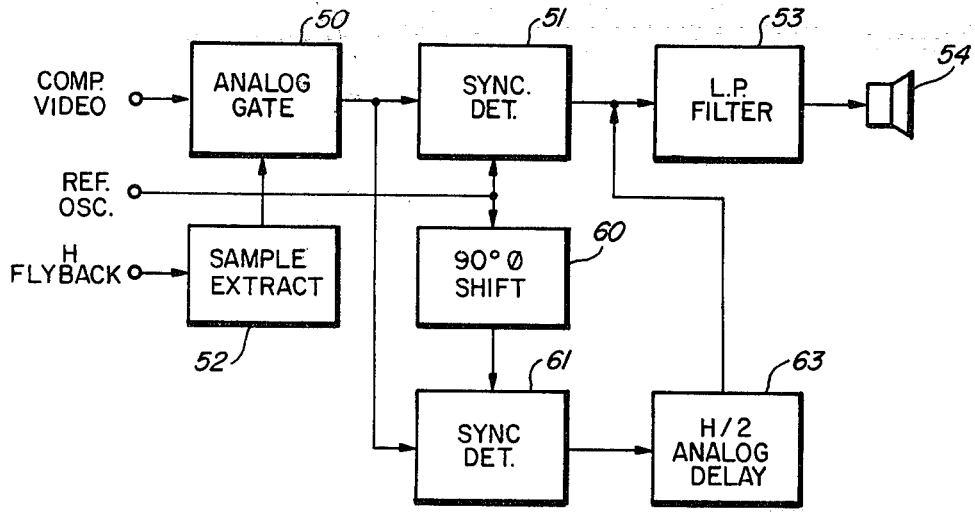
FIG. 6 is a block diagram of a portion of a circuit illustrating an alternative embodiment of the invention.

If it is desired to accomodate a single audio channel of the type shown in FIG. 5 but with double the bandwidth, that is two times 7.5 KHz or 15 KHz bandwidth, this is accomplished by means of the circuit shown in FIG. 6. In the circuit of FIG. 6, the components which are the same as the similar components of FIG. 5 are provided with the same reference numbers. An additional synchronous detector 61, however, is provided and is supplied with the output signals from the analog gate 50 in parallel with the signals supplied to the input of the detector 51. The output of the reference oscillator 30 then is supplied through a ninety degree phase shift circuit 60 to the reference input of the detector 61. The auxiliary signal transmitted by the transmitter and located on the front porch of the horizontal blanking interval is then modulated in quadrature in a manner similar to the manner in which the present color subcarier signal is modulated. By employing quadrature detection by means of the two detectors 51 and 61, as shown in FIG. 6, the quadrature samples for providing the increased bandwidth are available at the outputs of the synchronous detectors 51 and 52. To add these signals together to obtain a single 15 KHz bandwidth output signal, an analog delay circuit 63 having a delay of one-half (½) an horizontal time interval, H/2, is placed between the output of the synchronous detector 61 and the input to the low pass filter 53. Both of these signals, the delayed one from the detector 61 and the undelayed one from the detector 51, then are applied to the same low pass filter 53 for reproduction by the loudspeaker 54. The result of this circuit is one which has an effective sampling rate of twice the circuit shown in the system of FIG. 5. The system of FIG. 6 has three db less noise improvement than that of FIG. 5, because it has twice the noise bandwidth; but the S/N ratio is still such that usable sound reproduction is obtained from the modification of the circuit shown in FIG. 6 after the video or picture signal has become unusable.

The circuit of FIG. 6 also can be used to produce two separate (stereo) output signals in place of the single composite wider band audio signal of FIG. 6 simply by taking the output of the synchronous detector 61 and applying it separately through another low pass filter and another loudspeaker (not shown), if desired. In such a modification, the delay circuit 63 is eliminated from the circuit. Of course, each of the single stereo channels would have the 7.5 KHz bandwidth instead of the 15 KHz bandwidth which results from the circuit configuration of FIG. 6.

Figure 7:
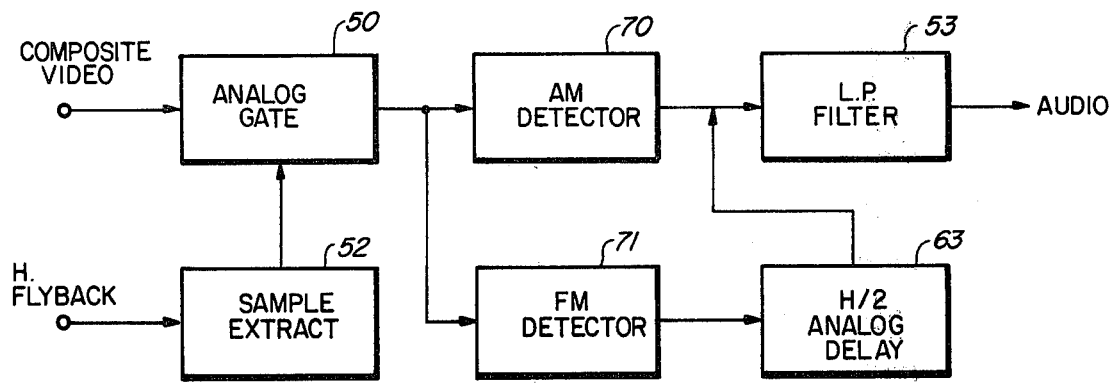
FIG. 7 is a block diagram of a portion of a circuit illustrating another alternative embodiment of the invention.

FIG. 7 illustrates another embodiment which can be incorporated into the system in FIG. 5. In the circuit of FIG. 7 a technique similar to the one shown in FIG. 6 is employed, but by using a combination of FM and AM modulation on the auxiliary signal subcarrier, it is possible to use non-coherent detection to produce the auxiliary output audio signal. Thus, the system of FIG. 7 can be used in monochrome receivers without requiring the addition of a reference oscillator to the receiver.

The circuit of FIG. 7 is quite similar to the circuit of FIG. 6 with the exception of the types of detectors which are employed. In FIG. 7 an AM detector 70 and an FM detector 71 are connected to the output of the analog gate 50 and are supplied with the bursts of modulated auxiliary signals passed by the gate 50. The two detectors, respectively, detect the information modulated on the auxiliary signal subcarrier; and where a single audio output having a 15 KHz bandwidth is desired, the configuration of FIG. 7 is employed. In this configuration, the output of the FM detector (or alternatively it could be the AM detector) is applied through the H/2 analog delay circuit 63 from which it then is combined with the output of the AM detector 70 to supply the composite signal to the input of the low pass filter 53. The resultant is an audio signal having a 15 KHz bandwidth which is reproduced by the loudspeaker 54 (FIGS. 5 and 6) in a suitable manner. Since non-coherent detectors are employed in the circuit of FIG. 7, no additional reference oscillator needs to be built into a monochrome receiver to permit it to detect the auxiliary audio signals processed by the circuit of FIG. 7.

Figure 8:
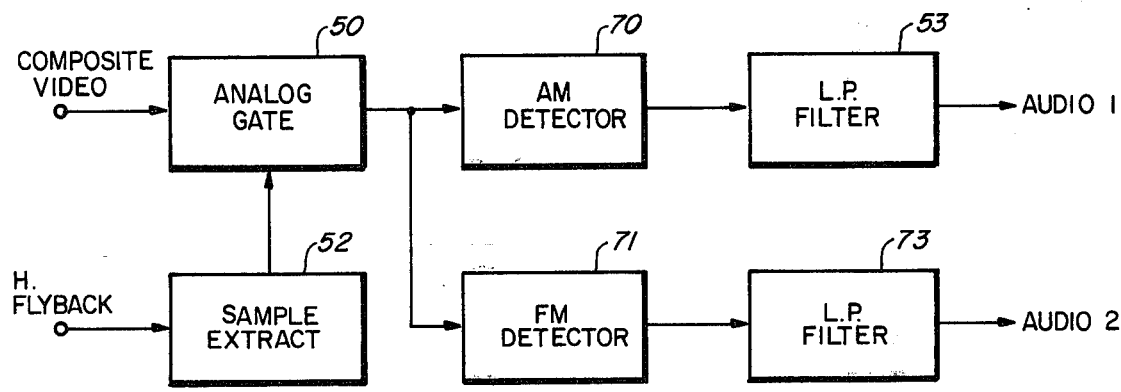
FIG. 8 is another block diagram of a portion of a circuit illustrating yet another embodiment of the invention.

FIG. 8 is a modification of the circuit shown in FIG. 7 which may be used when the auxiliary signal is modulated by AM and FM modulations to carry the two different parts of a stereophonic audio signal. In this application, the analog delay circuit 63 is eliminated and a second low pass filter 73 is connected to the output of the FM detector 71. An additional audio speaker (not shown) then is connected to the output of the low pass filter 73, while the output of the low pass filter 53 continues to supply signals to the speaker 54 (not shown in FIG. 8). The speakers connected to the outputs of the filters 53 and 73 then reproduce the two different portions of the stereophonic sound as detected by the two different detectors.

Other types of modulation may be employed in accordance with the particular implementation of the system which may be desired. The foregoing discussion, taken in conjunction with the various embodiments by which the invention may be implemented, illustrates the overall techniques which can be utilized to modify otherwise standard television receivers to detect and reproduce the auxiliary signals encoded on the front porch of the composite television signal.

It should be noted that the foregoing system has been described in conjunction with the production of audio signals, with specific mention being made for the reproduction of stereophonic signals or an auxiliary audio signal which is produced in addition to the conventional signal in the receiver as processed by the sound system 14 and supplied to the conventional television loudspeaker 16. This auxiliary signal, however, also may be used to modulate signals onto the auxiliary subcarrier in a different language from the signals produced by the conventional sound system of the receiver. In this way, the operator of the receiver, at his or her option, can select for reproduction the particular one of the two languages being detected and processed as desired. For example, in many areas of the country, residents speak either English or Spanish as their primary language; so that for such areas, both languages can be broadcast. A simple switch provided on the receiver then permits the user to select whichever one of the two languages is most desirable.

In addition, by employing the separation techniques discussed in conjunction with FIG. 8 as an option for the system of FIG. 5, it is possible even to provide this additional language capability in two additional languages, one from the outputs of each of the filters 53 and 73 of FIG. 8, in addition to the primary output provided by the sound system 14 and loudspeaker 16 shown in FIG. 5.

Another important possibility for use of the auxiliary signal located on the front porch as shown in FIG. 4 is to use frequency shift keying to modulate the subcarrier signal to provide a digital signal which can be decoded through a system of detectors of the various types shown in FIGS. 5, 6, 7 and 8, to decode digital information known as "teletext" information. This information then may be utilized or displayed in a conventional manner as an adjunct to or in place of the primary television composite signal which is processed by the television receiver circuit shown in FIG. 5. The frequency shift keying modulation (or other suitable types of digital encoding) used may be a two-phase modulation (for binary "1" or "0") or it may be four-phase, where two binary bits are transmitted on each front porch of the composite television signal. The techniques employed for encoding and detecting these frequency shift keying modulated signals are implemented in the same manner as described above in conjunction with the processing of audio signals.

Various changes and modifications will occur to those skilled in the art upon consideration of the various embodiments of the invention, which are shown in the drawings and which have been described above, without departing from the true scope of the invention. The various examples which have been described are to be considered illustrative of the invention only and not as limiting.

I claim:

1. An auxiliary signal system for television receivers responsive to composite color television signals and in which an auxiliary signal in the form of a modulated multiple-cycle signal burst at the frequency at the standard color subcarrier signal of the composite color television signal is transmitted on the front porch of the composite television signal, said system including in combination:

supplying means for supplying a composite television signal to signal processing circuits of a television receiver;

sample circuit means;

sweep circuit means in the television receiver producing horizontal fly-back pulses therefrom and coupled with said sample circuit means to operate said sample circuit means in response to the application of said horizontal fly-back pulses thereto;

demodulation circuit means for demodulating said auxiliary signals;

analog transmission gate circuit means coupled between said supplying means and the input of said demodulation circuit means, said gate circuit means further coupled with said sample circuit means and operated in response thereto to supply only said modulated auxiliary signal to said demodulation means; and utilization means coupled with said demodulation means for producing a representation of said demodulated auxiliary signals.

2. The combination according to claim 1 wherein the television receiver is a color television receiver having a color reference oscillator therein producing signals at the frequency of the color subcarrier component of the composite color television signal, and said auxiliary signal burst is at the frequency of the color subcarrier signal; and said demodulation means comprises a synchronous detector having first and second inputs, one of the inputs to which is obtained from the output of said analog transmission gate and the other input to which is obtained from the output of the color reference oscillator of the television receiver.

3. The combination according to claim 1 wherein said auxiliary signal comprises an amplitude modulated (AM) signal; and said demodulation means comprises an AM detector coupled between the output of said analog transmission gate and said utilization means.

4. The combination according to claim 1 wherein said auxiliary signal comprises at least in part an FM modulated signal, and said demodulation means comprises an FM detector connected between the output of said analog transmission gate and the input of said utilization means.

5. The combination according to claim 1 wherein said auxiliary signal comprises an AM and FM composite modulated signal, and said demodulation means comprise an AM detector and an FM detector each connected respectively between the output of said analog transmission gate and the respective inputs to said utilization means.

6. The combination according to claim 5 wherein said utilization means comprises first and second utilization means coupled, respectively, to the outputs of said AM detector and said FM detector for producing two separate representations corresponding, respectively, to the demodulated AM signals and the demodulated FM signals.

7. The combination according to claim 1 wherein said auxiliary signal comprises a quadrature modulated composite auxiliary signal and wherein said demodulation means comprises first and second synchronous detectors; said combination further including reference signal means for supplying reference signals in quadrature to said first and second synchronous detectors; wherein said first and second synchronous detectors are coupled between the output of said analog transmission gate and said utilization means.

8. The combination according to claim 7 further including a delay line, wherein the output of said first synchronous detector is coupled through said delay line to the input of said utilization means in common with the undelayed output of said second synchronous detector.

9. The combination according to claim 8 wherein the television receiver is a color television receiver having a color reference oscillator therein, and said quadrature modulated auxiliary signal comprises a modulated subcarrier signal at the frequency of the color subcarrier signal transmitted as part of a composite color video signal and wherein said reference signal applied to said first and second synchronous detectors is obtained from the output of the color reference oscillator in the television receiver.

* * * * *